United States Patent [19]

Johnson

[11] 4,013,181

[45] Mar. 22, 1977

[54] LOAD-COMPACTING VEHICLE

[76] Inventor: Raymond Neils Johnson, 6/307 Bondi Road, Bondi, New South Wales, Australia

[22] Filed: June 23, 1975

[21] Appl. No.: 589,549

[52] U.S. Cl. .............................. 214/82; 214/83.3; 100/245

[51] Int. Cl.² .............................. B60P 1/00

[58] Field of Search .................. 214/82, 83.3, 518; 100/245

[56] References Cited

UNITED STATES PATENTS

| | | | |
|---|---|---|---|
| 2,465,222 | 3/1949 | Green et al. | 214/83.3 |
| 3,003,411 | 10/1961 | Judd | 100/245 X |
| 3,049,250 | 8/1962 | Dempster et al. | 214/82 |
| 3,247,984 | 4/1966 | Gregory, Sr. et al. | 214/82 |
| 3,257,012 | 6/1966 | Berolzheimer | 214/83.3 X |
| 3,817,415 | 6/1974 | Lewis | 214/83.3 |

*Primary Examiner*—Albert J. Makay
*Attorney, Agent, or Firm*—McNenny, Pearne, Gordon, Gail, Dickinson & Schiller

[57] ABSTRACT

A load-compacting vehicle adapted to handle compressible refuse includes a wheeled chassis supporting a cylindrical barrel having a closed end and a door-like access end against which refuse can be compacted by a piston-like plunger contained in the barrel. The vehicle includes a ram device whereby the plunger can be advanced longitudinally of the barrel from the closed end to the access end to compress or expel refuse within the barrel depending upon whether the door-like access end is open or closed.

6 Claims, 8 Drawing Figures

LOAD-COMPACTING VEHICLE

This invention relates to load-compacting vehicles of the kind comprising: a wheeled chassis of trailer or automotive type; a cylindrical barrel (into which garbage or other compressible material may be fed) mounted on the chassis and having a leading or "closed" end and a trailing or "access" end; a door mounted in relation to the access end which can be opened for discharge of the barrel's contents or clamped in closure of the access end; a piston-like plunger in the barrel; and, hydraulic or pneumatic ram devices whereby the plunger can be advanced longitudinally of the barrel (from the closed end towards the access end) to compress the barrel's contents against the door, when closed, at that end. Such vehicles are referred to herein as being "of the type described."

Existing vehicles of the type described are open to objection in several respects. One of the main objections is that owing to the uneven compressibility of the materials handled by the vehicle, and the unavoidable concentration of those materials at floor-level within the barrel placing severe off-centre loadings on the plunger, it is difficult to ensure sustained effective working of the load compressing apparatus.

The object of this invention is to overcome the indicated disability in a simple manner, and generally to provide a load-compacting vehicle of the type described which is more efficient and reliable in operation, and more readily adaptable to a variety of load-compacting purposes, than is the case with such vehicles as devised heretofore.

The invention provides a load-compacting vehicle of the type described, which includes plunger mounting means comprising:

a. a pair of parallel rails which extend longitudinally within the vehicle barrel adjacent the top thereof and for substantially the full length thereof, b. first runner elements on said plunger by which it is mounted on said rails for load-compressing movement longitudinally of said barrel, c. an outrigger structure fixed on the ram device on which said plunger is mounted, and d. second runner elements on said outrigger structure which ride said rails and are spaced, axially of said barrel, from said first runner elements.

Examples of the invention are illustrated in the drawings herewith.

Figure 4:
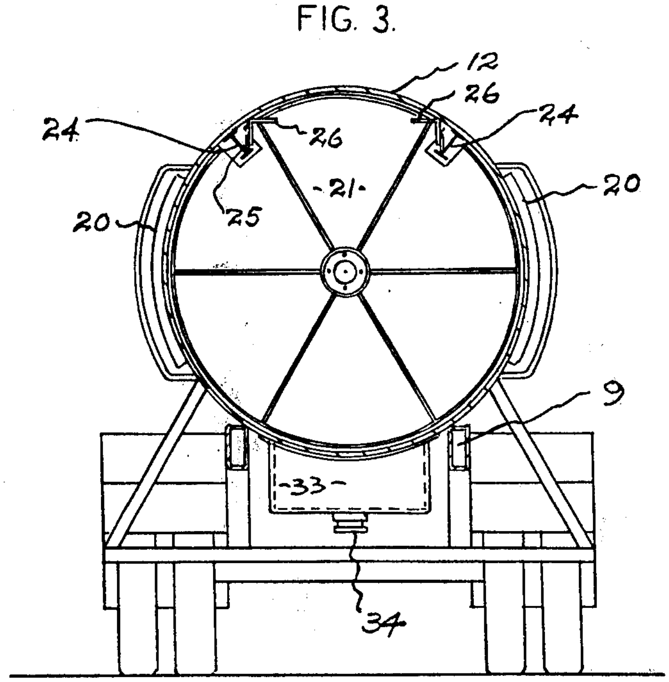
FIG. 4 is a sectional end elevation taken on line 4 — 4 in FIG. 1.
Figure 5:
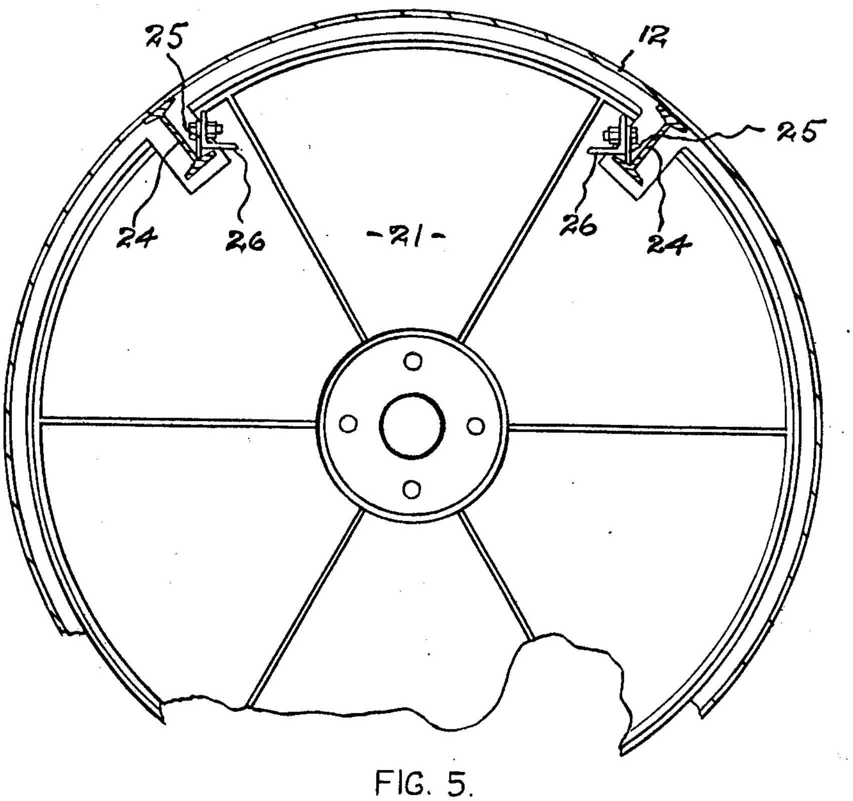

FIG. 5 repeats a portion of FIG. 4 on a somewhat enlarged scale.

Figure 1:
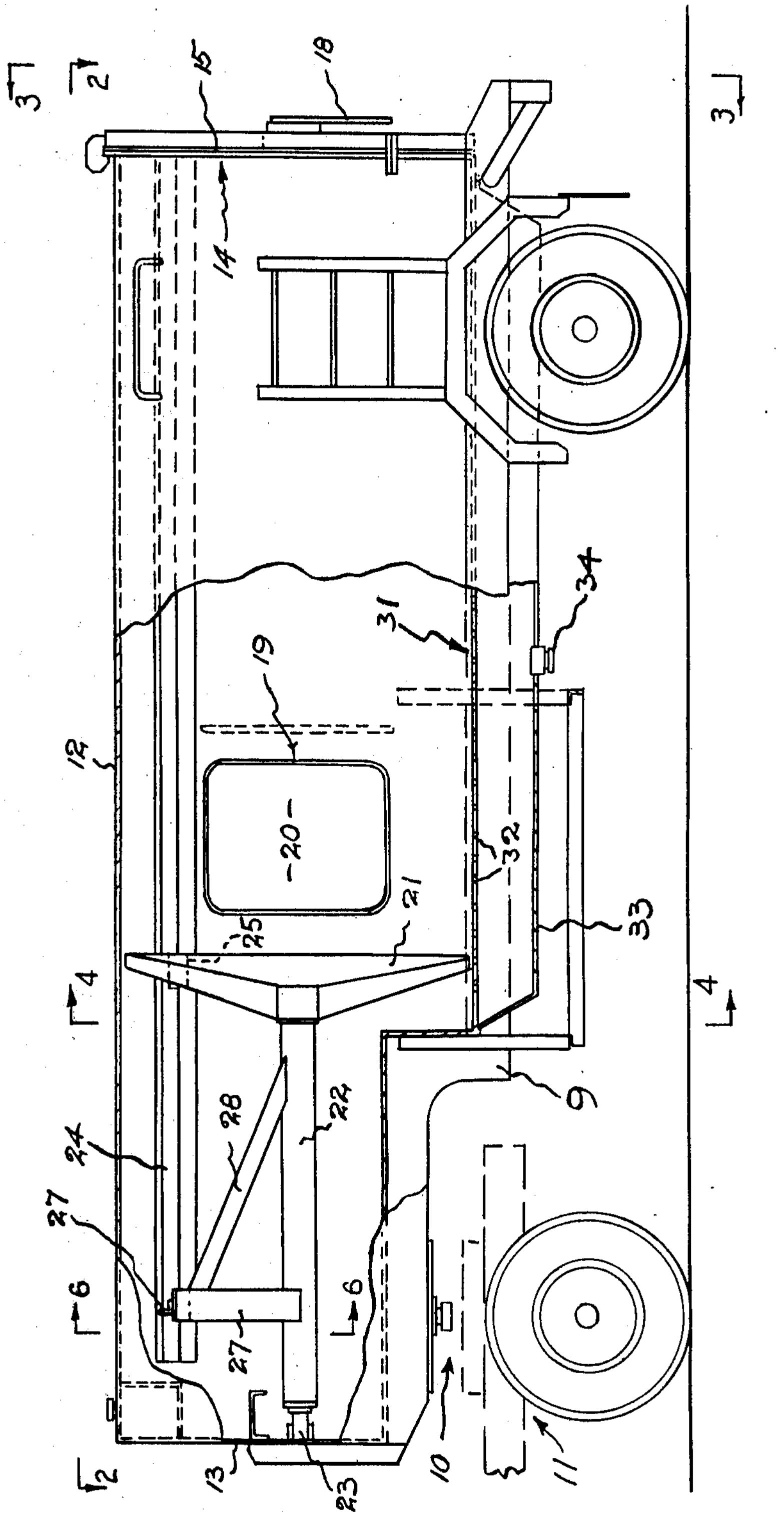
FIG. 1 is a partly broken away side elevation of an embodiment in the form of a trailer vehicle.
Figure 2:
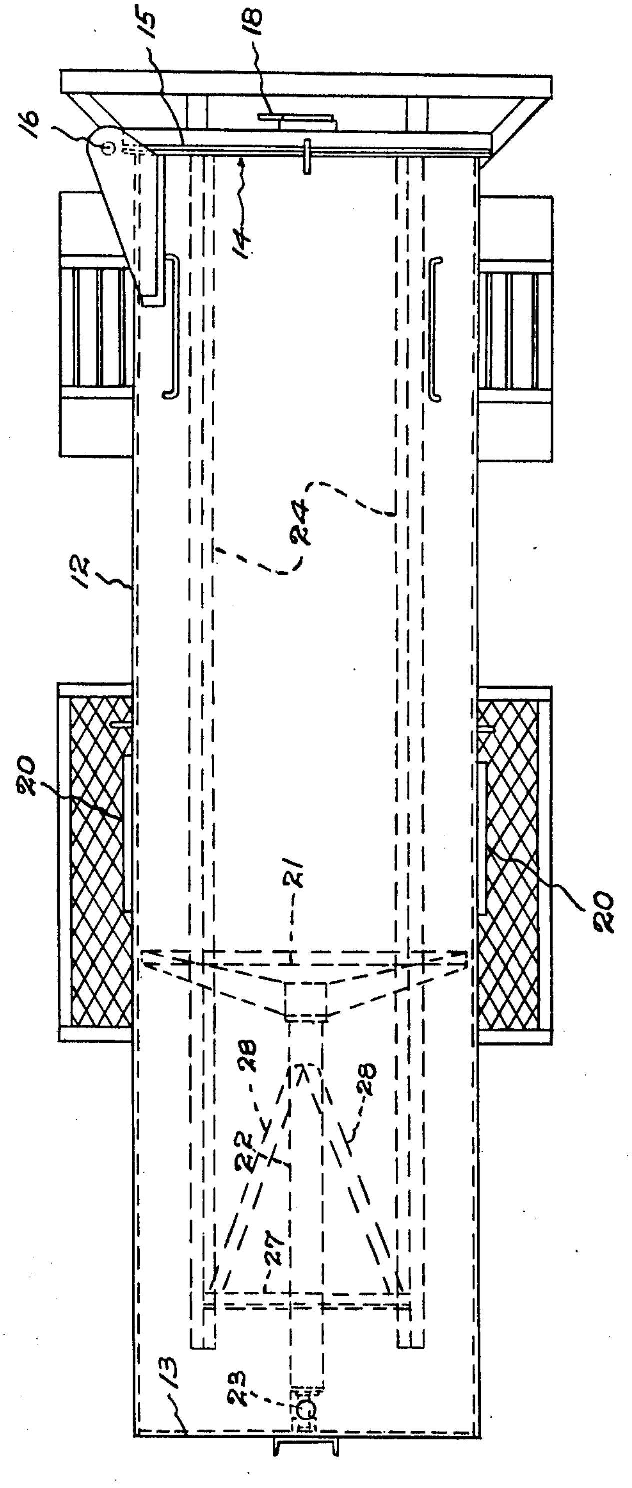
FIG. 2 is a plan taken as indicated by line 2 — 2 in FIG. 1.
Figure 3:
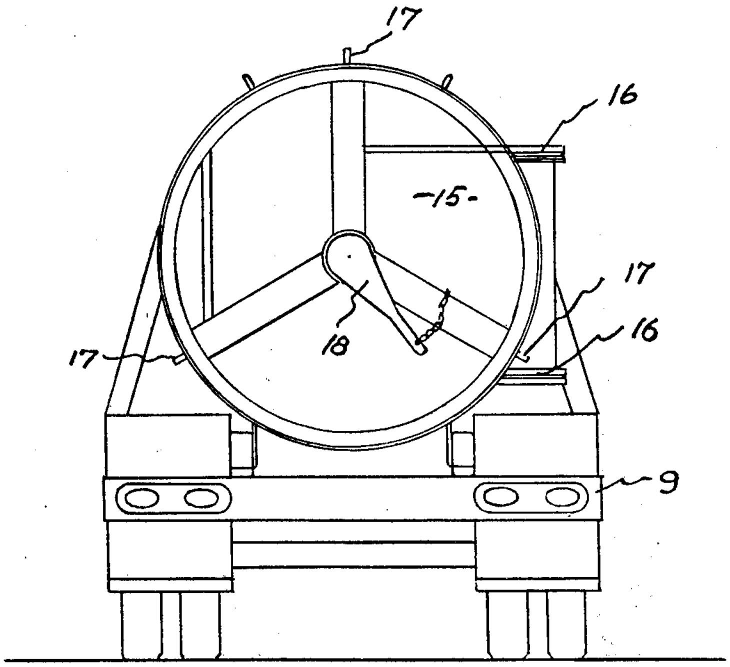
FIG. 3 is an end elevation taken as indicated by line 3 — 3 in FIG. 1.
Figure 6:
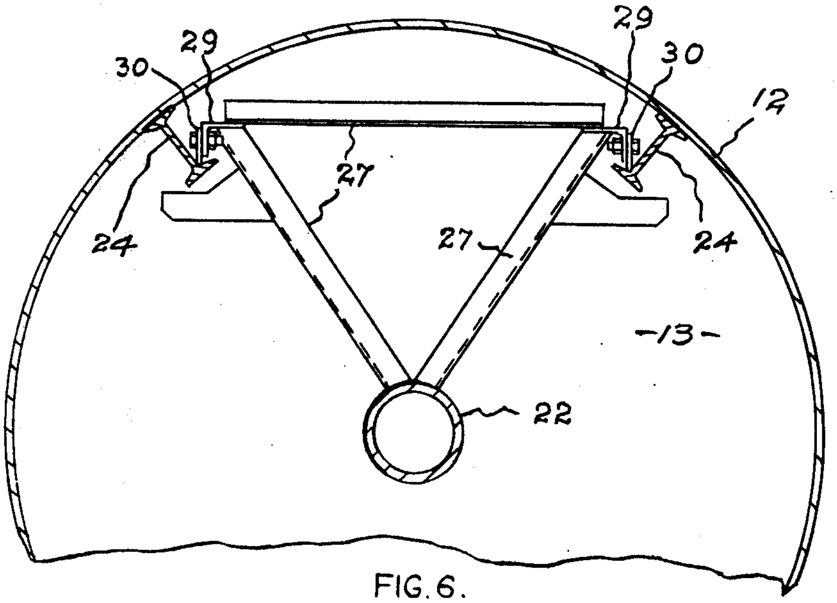

FIG. 6 is a sectional end elevation (on an enlarged scale) taken on line 6—6 in FIG. 1.

Figure 7:
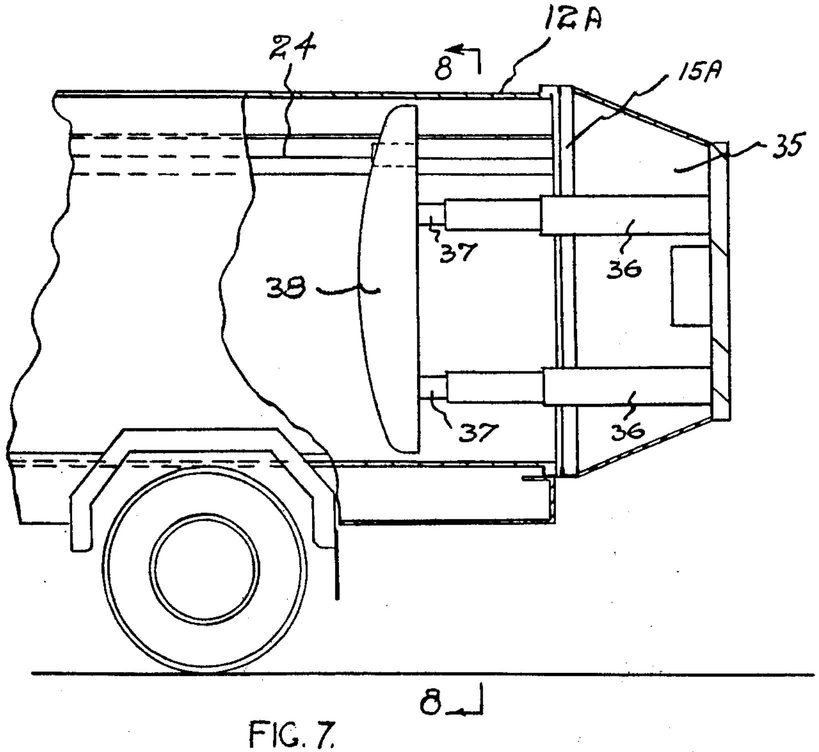

FIG. 7 is a partly sectioned side elevation of the trailing end of a vehicle showing a modified arrangement.

Figure 8:
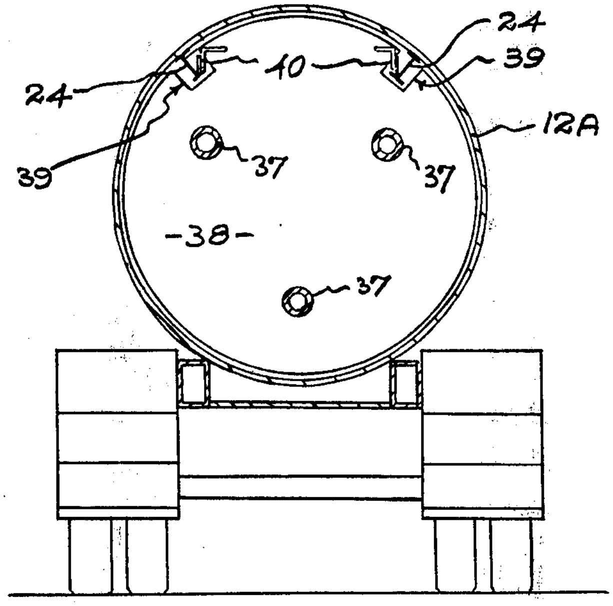

FIG. 8 is a sectional end elevation taken on line 8—8 in FIG. 7.

Referring to FIGS. 1 to 6 the vehicle comprises a wheeled trailer chassis 9 which, at its leading end is adapted, by conventional king-pin and turn-table arrangements, indicated at 10 (see FIG. 1), to be mounted in haulage relationship to a tractor vehicle, indicated at 11.

A cylindrical barrel 12 is mounted on chassis 9 and has a leading or closed end 13 and a trailing or access end 14. End 14 is equipped with a door 15 mounted on hinges 16 so that it may be swung clear of the access end opening or closed relative to that opening, and so held by operation of conventional locking arrangements indicated at 17 and operable by use of lever 18. Barrel 12 is furnished with one or more side doorways 19 through which matters to be compressed may be charged, and such a doorway (or each of them if more than one) is provided with a door 20 which can be clamped in closure of its doorway in conventional manner.

A piston-like plunger 21 is fixed on the trailing end of the cylinder 22 of a hydraulic or pneumatic ram whereof the piston is mounted, at 23, on closed end 13. This ram is operable in conventional way so that the plunger 21 can be advanced longitudinally of the barrel (away from closed end 13 towards access end 14) to compress the barrel's contents against the closed door 15.

Mounting means for plunger 21 include a pair of parallel rails 24 which extend longitudinally of the barrel, near the top thereof, and throughout the full length of that part of the barrel in which compaction of matters takes place. Plunger 21 is suspended from rails 24 by way of first runner elements which, as shown, may be slider blocks 25 of nylon or similar low-friction material. Blocks 25 are fixed on brackets 26 which, in turn, are fixed on the plunger 21 by welding or otherwise. If desired, the first runner elements may be rollers freely journalled on stub axles fixed to brackets 26.

An outrigger structure is fixed on cylinder 22. It consists of a triangular frame 27 and a pair of diagonal struts 28 rigidly secured on cylinder 22 by welding or otherwise. This outrigger structure is furnished with brackets 29 and second runner elements 30 which may be the same as those numbered 26 and 25 respectively. Like the first runner elements, the second elements are able to run freely along rails 24.

When the vehicle, as just described, is to be used, the plunger 21 is first fully retracted and door 15 is closed, as shown in FIG. 1. Matter to be compacted is fed into the barrel by way of doorways 19 and then compressed against closed door 15 by operation of plunger 21. The plunger is then again retracted and more matter fed in by way of doorways 19. This process is repeated until there is no room in the barrel for further additions to be made or until no more additions are required to be made.

The compacted load is then taken to a dumping site, and dumped by opening door 15 and then using plunger 21 as an ejector. It will be noted from this that the plunger 21 operates in two distinctly different ways; namely, as a compactor when door 15 is closed, and as an ejector when door 15 is open.

The vehicle as above described with reference to FIGS. 1 to 6 is primarily intended for use in the collection, compaction and disposal of garbage. It may however, be widely used for collection and compaction of other matters, particularly such matters from which it is desirable for moisture to be expressed in performing the compaction. Where this moisture extractive function is required, the lowermost floor portion 31 of the barrel is furnished with a number of liquid drainage holes as indicated at 32 in FIG. 1. These holes are able to discharge liquid into a collector trough, tank or launder 33 disposed under the barrel 12.

This liquid drainage facility is of considerable value even where the vehicle is used simply for the compaction and transport of garbage, because such garbage frequently includes a substantial proportion of moisture, inherently or due to rain exposure or otherwise. The liquid drainage facility however, finds particular utility in the compaction and transport of materials, other than garbage, which have a considerable unwanted moisutre ingredient; and still more so where the moisture ingredient is one of major economic importance.

As an example of the last mentioned aspect, the liquid drainage form of the present invention finds particular application in the harvesting of grapes and other fruits of which the juice content is of major importance and the remaining solid residues are of little or no importance except, perhaps, as mulching material, animal food or the like.

If the vehicle is to be used only for the compaction of wet garbage or other materials in which the moisture content is of no value, the launder 33 may be omitted and the expressed moisture allowed to run directly to waste. For preference however, the launder is present and is furnished with a liquid take-off valve or cock 34 which may simply be left open when the liquid is to be allowed to run to waste, and closed when the liquid is to be recovered, as in the case of fruit juices and the like. In such case the take-off valve is then operated as and when required for liquid discharge into some other container, either directly or by way of a pipe or hose coupled to the take-off valve.

It will be appreciated that vehicles according hereto may be constructed with widely differing capacities for acceptance and transport of compressed matters. This difference in capacity may be such that one large capacity vehicle may be used as a "mother" vehicle able to accept the compressed loads of a plurality of smaller capacity vehicles which thus act as feeder vehicles.

The intended manner of using these different capacity vehicles, would be to station the motor vehicle at some convenient central location, and for the feeder vehicles to pick up loads in the general vicinity of the central location, compress those loads and bring them and transfer them to the barrel of mother vehicle, so that the mother vehicle can then, in a single trip, take the plurality of feeder loads (after further compression thereof if desired) to a dumping place or elsewhere as may be required.

Thus a mother vehicle according hereto, while being of the type described, differs from a feeder vehicle in having a load capacity which is at least sufficient to accept two feeder vehicle loads, and in being equipped with means enabling it to perform that acceptance effectively.

It will be appreciated that because of overall vehicle height and road-width limitations, the barrel of a mother vehicle according hereto cannot derive much in the way of extra load capacity merely by increase in barrel diameter; indeed, it is desirable for the diameters of the mother and feeder barrels to be about the same so to permit the open ends of the two barrels to be brought into close register and clamped together in a mouth-to-mouth fashion for easy transfer of a feeder load into a mother barrel.

This means that the mother barrel should preferably derive its superior capacity largely by increase in barrel length and or by further densification of the feeder loads received by it.

Both of these ways of increasing mother barrel capacity present some degree of difficulty, in that the first way lengthens the maximum distance over which the feeder loads have to be thrust into the mother barrel and the second way can be achieved (by use of the mother barrel plunger) only by loss of effective barrel space at the leading or plunger end of the mother barrel. In other words, a plunger such as 21 can act as a compactor only by bearing rearwardly towards an obstruction such as closed door 15 and in doing this the barrel space through which the plunger has swept is necessarily left wastefully unoccupied. The amount of this wasted capacity is not great in a vehicle of the kind shown in FIGS. 1 to 6 because addition of matters may be effected, with plunger 21 retracted, by way of doorways 19; but in a mother vehicle in which feeder loads are to be inserted through the rear end of the barrel it becomes desirable for the plunger such as 21 to remain fully retracted during loading, and to provide extra compacting means able to bear forwardly of the barrel from its rear end towards the fully retracted plunger such as 21. In short, the arrangement is such that a feeder load may be transferred to a mother barrel by use of the feeder vehicle's plunger 21; both vehicles having their rear doors wide open and their open ends in mouth-to-mouth association. The extra compacting means may then be operated to compress the inserted feeder load in a forward direction; that is, towards retracted plunger 21, in readiness for addition of a further feeder load to the mother barrel. Under these circumstances the plunger 21 acts merely as a fixed obstruction against which load compression may be effected, and as an ejector when the full mother load is to be finally dumped.

Thus, a modified form of the present invention, suitable for use as a mother vehicle, consists of a vehicle of the type described in relation to FIGS. 1 to 6, further characterised by the incorporation therein of:

a. a compaction head able to enter said barrel through its rear end, b. means for axially advancing said head forwardly within and retracting it from said barrel, and c. mounting means for said head whereby it may be moved clear of said rear end so to permit loading of said barrel through said rear end.

An example of the mentioned modified form of the invention is illustrated in FIGS. 7 and 8. Referring to these Figures, the rear end of the vehicle barrel 12A is furnished with a door 15A which can be swung clear of the barrel rear end or clamped in closure thereof. On its outer side this door carries a rearwardly projecting carrier frame 35 which constitutes a fixed mounting for one or more (preferably three) multitelescopic hydraulic or pneumatic rams by their stationary ends 36. These rams extend through openings in door 15A so to project normally from the indoor face thereof. The other or movable ends 37 of the ram piston-rods have the mentioned compaction head 38 mounted thereon so that when the door is closed and locked in closed position the head may be advanced axially and forwardly of the barrel.

The inner or working face of the compaction head may be flat, concave or convex. For preference its shape is substantially complementary to the working face of the main plunger 21 which is operable, as previously described, from the other or leading end of the barrel.

The compaction head may be merely gapped, as indicated 39, so as to clear the rails 24, or as well, it may be furnished with third runner elements 40 which may be the same as those previously described herein.

When the mother vehicle is in use its plunger is initially fully retracted towards the leading end of the vehicle barrel, and the barrel door (with its head 38 fully retracted) is swung clear of the rear end of the barrel.

A loaded feeder vehicle is then brought to the mother vehicle, and their open barrel ends are placed in close register and so held. The plunger 21 of the feeder vehicle is then advanced to transfer its load into the mother barrel 12A. This process may be continued until the loads already placed in the mother barrel become so obstructive that addition of a further feeder load is beyond the capacity of the feeder vehicle intended to make that addition. Under these circumstances the still-loaded feeder vehicle is backed off and the mother vehicle door 15A is then closed and locked. The head 38 is then operated to transfer the mother load towards the far end of the mother barrel; and, for preference, is operated to such a degree as will substantially further compress the matters in the mother barrel.

Following the action just described, the head 38 may be retracted, and the door 15A re-opened for reception of still further feeder loads.

When the mother vehicle is loaded to the required extent, it can be driven to a dumping place or other required location, and its load discharged simply by opening door 15A and operating the mother plunger (such as 21) to eject the load.

I claim:

1. A load-compacting vehicle which includes plunger mounting means comprising:

a pair of parallel rails which extend longitudinally within the vehicle barrel adjacent the top thereof and for substantially the full length thereof;

first runner elements on said plunger by which it is mounted on said rails for load-compressing movement longitudinally of said barrel;

an outrigger structure fixed on the ram device on which said plunger is mounted, and second runner elements on said outrigger structure which ride said rails and are spaced, axially of said barrel, from said first runner elements, said outrigger structure having a triangular frame spaced from said plunger and having a first apex portion fixed to a cylinder forming part of said ram device and second and third apex portions at which said second runner elements are respectively located; and a pair of diagonal struts having trailing ends fixed to said cylinder adjacent said plunger and leading ends joined to said triangular frame adjacent said second and third apex portions.

2. A vehicle according to claim 1 wherein said barrel has liquid drainage holes formed in its lower most floor portion.

3. A vehicle according to claim 2 which includes a launder mounted beneath said barrel as a catchment vessel for moisture expressed through said holes.

4. A vehicle according to claim 1 which includes:

a. A compaction head able to enter said barrel through its rear end, b. means for axially advancing said head forwardly within and retracting it from said barrel, and c. mounting means for said head whereby it may be moved clear of said rear end so to permit loading of said barrel through said rear end.

5. A vehicle according to claim 4 wherein said means for axially advancing and retracting said head consist of at least one ram having said head mounted on its movable end and having its stationary end fixed on a carrier frame movable from and fixable in relation to the rear end of said barrel.

6. A vehicle according to claim 5 wherein the mounting means for said compaction head include a hinge-mounted door whereon said carrier frame is fixed and which can be swung clear of said open end or fixedly clamped in closure thereof.

* * * * *